United States Patent Office 2,888,895
Patented June 2, 1959

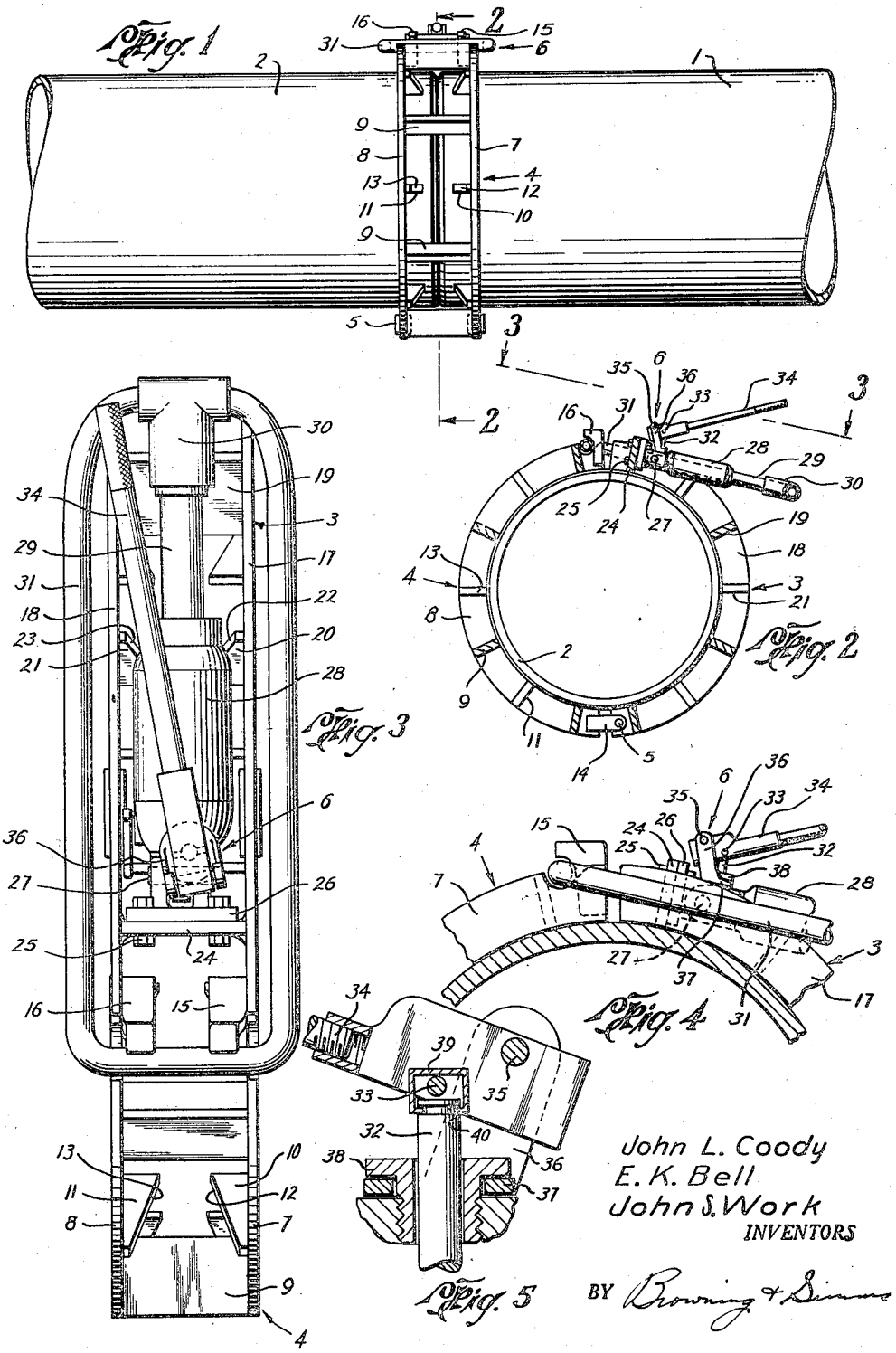

2,888,895

PIPE LINEUP CLAMP

John L. Coody, Houston, Tex., and John S. Work and Eugene K. Bell, Tulsa, Okla.; said Coody assignor to Paul Barkley, Houston, Tex.

Application November 20, 1950, Serial No. 196,608

6 Claims. (Cl. 113—102)

This invention relates to a pipe clamp for use in clamping and lining up the ends of two sections of pipe for the purpose of joining them together as by welding or the like.

Pipe lineup clamps have been employed in the past for this purpose, but as previously constructed have been difficult to handle, not readily adaptable to use on pipe in which the tolerance of outside dimension for a given nominal dimension varies as greatly as it does in actual practice, and have in most instances been of such construction that the application of a large amount of force in an effort to obtain accurate alignment of two pipe sections would tend to distort the ends of such sections.

It is a general object of this invention to provide a pipe clamp which will overcome the difficulties encountered in connection with previously used clamps without in anywise interfering with the operation of welding the two pipes together when they are clamped in aligned position.

More specifically, it is an object of this invention to provide a pipe lineup clamp which will not tend to distort the ends of the pipe sections being clamped, but will instead tend to correct any distortion which the pipe ends may already have.

Another object is to provide a clamp which will offer the minimum interference with the welding together of the ends of the pipe sections being clamped, yet provide the maximum bearing area adjacent the pipe ends.

Another object of this invention is to provide a clamp with a means for connecting the parts of the clamp together while the pipe is misaligned a substantial amount and drawing such parts quickly together to substantially closed and latched position, in combination with a means of applying a great force to the parts of the clamp for tightening the clamp into its final clamped position.

Another object is to provide a clamp with a jack for tightening the clamp on a pipe and an operating handle for the jack which may be adjusted to any angular position found most convenient by the operator.

Other objects and advantages of this invention will become apparent from the following description taken in connection with the accompanying drawings which are by way of example and illustration only and are not to be taken by way of limitation.

In the drawings:

Fig. 1 is a side elevation of the end portions of two sections of pipe with the pipe clamp constructed in accordance with this invention in position to maintain such pipe sections in alignment with each other for the purpose of welding them together.

Fig. 2 is a transverse cross section taken along the line 2—2 of Fig. 1.

Fig. 3 is an enlarged view substantially in plan showing the pipe clamp of Figs. 1 and 2 without the pipe in position therein, this view being taken substantially along the line 3—3 of Fig. 2.

Fig. 4 is a fragmentary cross section illustrating a part of the latching and tightening mechanism for joining the two parts of the clamp together and tightening them upon a pipe, this view showing such mechanism in side elevation.

Fig. 5 is an enlarged fragmentary detail partly in cross section illustrating the mounting for the operating handle for the jack forming a part of the tightening mechanism, and illustrating the manner of mounting such handle so that it may be adjusted to any desired position.

Referring now more in detail to the drawings, there are shown in Fig. 1 two pipe sections 1 and 2 joined together and aligned by a clamp constructed in accordance with this invention. Such clamp as illustrated in Fig. 2 comprises two curved shoes or sections 3 and 4 joined together at adjacent ends by means of a hinge 5, and at their opposite adjacent ends adapted to be connected to each other and tightened against each other by means of a latching and clamping mechanism 6.

The shoe 4 is illustrated as being formed of two arcuate plate sections 7 and 8 and which are parallel to and spaced from each other and joined together at circumferentially spaced points by means of webs 9 welded or otherwise secured at their opposite ends to the arcuate plates 7 and 8. It is noted that the inner arcuate edges of these plates 7 and 8 are made of the same curvature as the pipes to be clamped by the clamp, and that the webs 9 are positioned with their inner edge surfaces flush with the inner edge surfaces of the arcuate plates 7 and 8. Thus each arcuate plate will provide a continuous contact with a pipe embraced thereby so that when tightly clamped against such pipe it will not tend to distort the same. Additional bearing area against such pipe will be provided by the webs 9 and these webs 9 will, as illustrated in Fig. 1, extend across the joint between the ends of two pipe sections so as to accurately align such ends.

Still further bearing area against each of the two pipe sections adjacent their ends may be provided by securing to the respective arcuate plates 7 and 8 intermediate the webs 9, opposed bearing members 10 and 11. These bearing members 10 and 11 are similar to the webs 9 except that they are interrupted so as not to cover the joint between the two pipe sections where the welding is to take place, this joint being left free so as not to interfere with the welding operation. It is to be noted that these bearing members 10 and 11 are beveled or cut back so that they flare away from each other in a direction radially outwardly from the pipe surface, thereby providing for even greater freedom from interference with the welding operation. Such flaring is indicated by the numerals 12 and 13.

The hinge connection 5 is provided by means of ears or lugs 14 welded or otherwise secured to one of the shoes 4 on the arcuate plates making up such shoe, and pivoted at 5 to the other shoe 3.

At its end opposite the lugs 14, the shoe 4 is provided with a pair of hooks or lugs 15 and 16 welded or otherwise suitably secured to the arcuate plates 7 and 8 respectively adjacent their ends.

The other arcuate shoe 3 is likewise made up of two arcuate plates 17 and 18 which are generally similar to the arcuate plates 7 and 8 of the shoe 4, and which likewise are made of such an arcuate inner contour as to conform as nearly as possible to the surface of the pipe section to be clamped thereby. These two arcuate plates 17 and 18 are interconnected at circumferentially spaced points by webs 19 which are similar in all respects to the webs 9, and are similarly positioned. Intermediate the webs 19 will be found bearing plates 20 and 21 having beveled or tapered end surfaces 22 and 23, these bearing members corresponding in shape, position, and purpose, to the bearing members 10 and 11 previously described.

Adjacent its end opposite the hinge 5, the shoe 3 is provided with a web member 24 which forms an abutment for the latching and tightening mechanism now to be described. This abutment 24 bridges the space between the two arcuate plates 17 and 18 and is provided with holes for the reception of bolts 25 or the like by which may be joined to the abutment 24 a bracket 26. This bracket 26 has spaced ears perforated to provide for the reception of a pivot pin 27 joining these ears to a lug on a jack 28 which is illustrated as being in the form of a hydraulic jack, but which as will presently appear may be in the form of any mechanism whereby a great mechanical advantage can be exerted or whereby in some other manner a great force may be applied to draw the clamp tightly into clamped position.

The hydraulic jack illustrated in this instance has on one end a lug adapted to be connected to the pivot pin 27, this lug being shown as carried on the cylinder of the jack 28, this jack being also provided with a piston rod or plunger 29 having a T-like fitting on its free end adapted to receive a transverse portion of a latching link 31. This link 31 is of such extent that when the shoes 3 and 4 are closed against each other to such an extent as to closely and fully embrace a pipe of the nominal size for which they are intended, the end of the link opposite the fitting 30 will closely engage within the hooks provided by the lugs 15 and 16, and will permit the hydraulic jack 28 when fully contracted to assume such a position that, as illustrated in Fig. 4, the center line of the link between the points where it is pivoted to the hooks 15 and 16 and the point where it is pivoted to the fitting 30, will be a position slightly radially inwardly from the center line of the pivot 27. It will be seen that in this position the toggle mechanism provided by the link 31 and the hydraulic jack 28 will be locked so that the application of force provided by the expansion of the jack 28 will not tend to throw the toggle mechanism to open position but will instead tend to tighten it in closed position.

It will further be observed that with this sort of mechanism, if the clamp be placed about the adjacent ends of two sections of pipe which are substantially out of alignment with each other, the fitting 30 may be moved away from the shoe 3 so as to extend the link 31 toward the other shoe and permit it to be engaged with the hooks 15 and 16 thereon, after which the fitting 30 may be moved back to the position shown in Fig. 2 thereby drawing the shoes 3 and 4 together and the pipe ends into alignment with each other.

After the latching mechanism has been engaged and the shoes 3 and 4 drawn together in the manner just described so as to move the pipe sections 1 and 2 into substantial alignment with each other, a greater force may be applied through the medium of the hydraulic jack 28 for the purpose of tightly and rigidly clamping the ends of the pipe sections 1 and 2 in accurately aligned position, and by virtue of the fact that not only the webs 9 and 19 and the bearing members 10, 11, 20 and 21 engage the surface of the two sections of pipe, but also in view of the fact that the arcuate plates 7, 8, 17 and 18 are so shaped as to bear against the outer surface of the pipes substantially throughout its circumference, the application of a very great clamping force is made possible without any tendency whatever to distort the ends of the pipe sections. In fact, the application of such force will tend to remove any distortion which may exist in such pipe sections and thereby accurately align not only the ends of the pipes taken as a whole, but also the pipe walls throughout their respective circumferences.

The details of the hydraulic jack are not here illustrated because such jacks are more or less standard articles of commerce and no attempt is here made to claim any novelty in the details of the jack mechanism. In fact, as above pointed out, some other form of jack than the hydraulic jack mechanism here illustrated might be employed, or some other means for applying a great clamping force may be employed instead of a manually operated jack.

However, it is to be noted that the actuating plunger 32 of the manually operated jack illustrated is intended to be operated in such fashion as to be most convenient for the operator. This plunger 32 is thus shown as operating through the medium of a pivot 33 carried on an operating handle or lever 34 which is intended to be reciprocated about its fulcrum 35 by means of an operator who stands adjacent the clamp. The fulcrum pin 35 is carried on a pair of upstanding ears of a bracket mounted on the body of the jack mechanism, these ears being shown at 36. The body of this bracket is shown in the form of a perforated washer 37 adapted to be loosely held beneath the head 38 of a hollow screw which surrounds the plunger 32 and engages the body of the jack. Thus it will be seen that the bracket 36 is permitted to swivel about the axis of the plunger 32 as a center.

The connection between the plunger 32 and the handle 34 is, as above stated, by means of a pivot pin 33, but such pivot pin is made to engage a separate fitting 39 as clearly illustrated in Fig. 5, and this fitting 39 is connected with a swivel connection to the plunger 32 so that the handle 34 may be free to swivel with respect to the plunger 32 without disturbing the pivotal connection between the handle 34 and the plunger 32.

It will be noted that the foregoing mounting of the handle 34 makes it possible for this handle to be swiveled about the center line of the plunger 32 to occupy any desired position depending upon the convenience of the operator, and to be operated in such position. The ability to operate the handle in any one of a large number of positions is a matter of great convenience to the operator and greatly facilitates the use of this clamp.

From the foregoing it will be seen that the clamp which has been provided by the structure illustrated and described is one which may be made to engage the ends of pipes of which are substantially out of exact alignment with each other and to be latched about them and then drawn together so as to substantially align the pipes. This mechanism, furthermore, makes it possible upon bringing the pipes into substantial alignment with each other and upon being latched about the pipes, to apply a relatively great clamping force to the pipes by a means cooperating with but additional to the means employed for performing the initial latching operation and drawing the pipes into substantial alignment with each other. It is noted in this connection that the toggle arrangement formed by the link 31 and the contracted jack is a means of small mechanical advantage which performs a dual function of drawing the respective shoes of the pipe clamping structure toward each other to substantially align the pipes, and to then latch such shoes in closed position. On the other hand, the hydraulic jack, cooperating with the link 31, serves, after such latching has taken place, to apply a relatively much greater force to the shoes to securely clamp them in position to accurately align the two pipe sections. This means, where it depends upon the exertion of manual effort for providing such great force, is of much greater mechanical advantage than the toggle linkage above described. It is further noted that while this means for applying a greater force to clamp the two shoes of the clamping mechanism together is shown as a part of and as acting through the linkage and toggle mechanism, it need not necessarily be so disposed although such disposition is advantageous. The essential with regard to this feature of the invention is that there be two mechanisms, one for quickly drawing the shoes together and latching them in place, and one for applying a relatively great force to clamp them tightly about the ends of the pipe sections which form the work.

The application of a much greater clamping force than would otherwise be possible, is made practical through the employment of shoes having parts such as the arcuate plates which provide a substantially continuous line of engagement between the shoes and the pipes throughout the circumferences of the pipes. By virtue of this arrangement great forces may be applied to the pipes without any tendency toward distortion thereof, and actually the greater forces that are applied to the pipes the greater the tendency to reduce any distortion and to accurately align the two pipe sections. Greater bearing area is provided between the shoes and the pipe sections by virtue of the webs extending between the arcuate plates and by virtue of the bearing members 10, 11, 20 and 21.

Thus, the structure illustrated and described constitutes a means for carrying out and accomplishing all of the objects and advantages sought by this invention.

The invention having been described, what is claimed is:

1. A pipe clamp comprising opposed shoes hingedly connected together and adapted to embrace and bridge the joint between a pair of opposed pipe ends to align them, a small mechanical advantage latching means for drawing said shoes together into and latching them in substantially closed position about said pipe ends, and a greater mechanical advantage means for tightening said shoes about said pipe ends after they have been so closed and while being held by said latching means in said substantially closed position, in which said small mechanical advantage means is a toggle link mechanism having a readily detachable pivotal connection with a free end of one of said shoes and carried on the adjacent free end of another of said shoes.

2. A pipe clamp comprising opposed shoes hingedly connected together and adapted to embrace and bridge the joint between a pair of opposed pipe ends to align them, a small mechanical advantage latching means for drawing said shoes together into and latching them in substantially closed position about said pipe ends, and a greater mechanical advantage means for tightening said shoes about said pipe ends after they have been so closed and while being held by said latching means in said substantially closed position, in which said small mechanical advantage means is a toggle link mechanism having a readily detachable pivotal connection with a free end of one of said shoes and carried on the adjacent free end of another of said shoes and in which said greater mechanical advantage means comprises a jack forming one of the links of said toggle link mechanism and disposed to apply force to said mechanism to move a free end of a shoe toward a free end of another shoe.

3. A pipe clamp which comprises, in combination, opposed shoes hingedly connected together and adapted to embrace and bridge the joint between a pair of opposed pipe ends to align them, said shoes each comprising a pair of substantially rigid members extending substantially throughout the length of the shoe and each having its inner extremity substantially that of a circular arc, said shoes each having a free end, and means for drawing the free ends of said shoes toward each other to cause the shoes to tightly embrace said pipe ends comprising a link, a jack having relatively movable parts, one of which is pivotally connected to said link and the other to one of said shoes adjacent its free end, said link having a part remote from its pivotal connection to said jack part which is releasably pivotally engageable with the free end of the other of said shoes, said jack being disposed to pivot in one direction about its said connection with said shoe to move a part of said link toward the free end of said other shoe and to pivot in an opposite direction to cause said link to draw said free ends toward each other and then to apply force to said link to further draw the free ends of said shoes still further toward each other.

4. The clamp of claim 3 wherein said jack is pivotable from a first position where its connection to said link is on one side of a plane through the axes of the pivotal connection between the jack and said one shoe and the pivotal connection between the link and said other shoe to a second position where its connection with said link is on the other side of said plane.

5. A pipe clamp which comprises, in combination, opposed first and second shoes hingedly connected together neither of which substantially exceeds 180° in length and having free ends adapted to be drawn toward each other so that the shoes embrace and bridge the joint between a pair of opposed pipe ends to align them and when tightened in such embracing relation forming a substantially complete circle, and means releasably joining said free ends for securing and tightening said shoes in embracing relation about such pipe ends comprising a jack having parts movable away from each other by a force applying mechanism, a pivotal connection between one of said jack parts and said first shoe adjacent its free end, a link, a pivotal connection between the other of said jack parts and one part of said link, a releasable pivotal connection between another part of said link, spaced from said one part thereof, and said second shoe, said jack being pivotable in one direction to move said link toward said second shoe and pivotable in an opposite direction to move said link so as to draw the free ends of said shoes toward each other and latch them in substantially closed position about such pipe ends, said jack parts being movable apart by said force applying mechanism after the shoes have been so closed to further tighten the shoes about said pipe ends.

6. A pipe clamp comprising a plurality of arcuate shoes neither of which substantially exceeds 180° in length hingedly connected together and adapted to embrace and bridge the joint between a pair of opposed pipe ends to align them and when tightened in such embracing relation forming a substantially complete circle, and means for tightening such shoes in embracing relation about said pipe ends, said shoes each comprising first and second curved substantially rigid members extending substantially throughout the length of the shoe, connectors rigidly joining together said first and second rigid members of a single shoe in parallel and in spaced axial relation, the radially innermost extremities of said first and second rigid members of both shoes, with the shoes tightened in pipe embracing relationship, being arcuately shaped about a common axis, said connectors having a portion of their radially innermost edges extending from each of said first and second rigid members toward the joint betwene a pair of pipe ends grasped by said shoes with said portion disposed in a straight line which is parallel to said common axis and flush with the adjacent portions of said arcuate innermost extremities of the rigid members, and bearing webs carried by said rigid members respectively and extending therefrom toward each other and terminating in spaced relation to each other, said bearing webs having their radially innermost edges also disposed in a straight line parallel to said common axis and flush with the adjacent portions of said arcuate innermost extremities of the rigid members, said connectors and webs being disposed in spaced circumferential positions along the length of each of said shoes and sufficient in number to remove reasonably predictable flare from pipe ends embraced by said shoes.

References Cited in the file of this patent

UNITED STATES PATENTS

| 926,609 | Robinson | June 29, 1909 |
| 1,104,579 | Thorsby | July 21, 1914 |
| 1,361,593 | Lang | Dec. 7, 1920 |
| 1,550,161 | Hamm et al. | Aug. 18, 1925 |
| 1,693,064 | Tipton | Nov. 27, 1928 |
| 1,774,530 | Sheehan | Sept. 2, 1930 |

(Other references on following page)

UNITED STATES PATENTS

| | | |
|---|---|---|
| 1,969,572 | Maurer | Aug. 7, 1934 |
| 2,091,307 | Catlett | Aug. 31, 1937 |
| 2,127,828 | Milton | Aug. 23, 1938 |
| 2,308,340 | Newlon | Jan. 12, 1943 |
| 2,354,794 | Buehler | Aug. 1, 1944 |
| 2,360,417 | Grenfell | Oct. 17, 1944 |
| 2,365,151 | Solomon | Dec. 19, 1944 |
| 2,417,741 | Dillon | Mar. 18, 1947 |
| 2,433,172 | Tipton | Dec. 23, 1947 |
| 2,469,965 | Holt | May 10, 1949 |
| 2,557,202 | Raymond et al. | June 19, 1951 |
| 2,632,417 | Smith | Mar. 24, 1953 |
| 2,674,966 | Morris | Apr. 13, 1954 |

FOREIGN PATENTS

| | | |
|---|---|---|
| 14,441 | Great Britain | of 1915 |